June 28, 1960   M. MIRSKY ET AL   2,943,009
PROCESS FOR MAKING REINFORCED RUBBER ARTICLES
Filed June 1, 1956   3 Sheets-Sheet 1
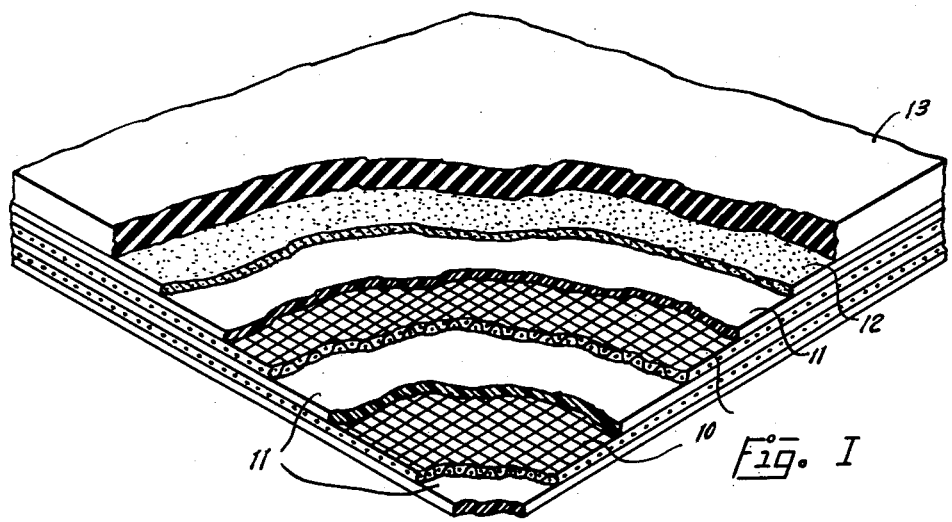
Fig. I
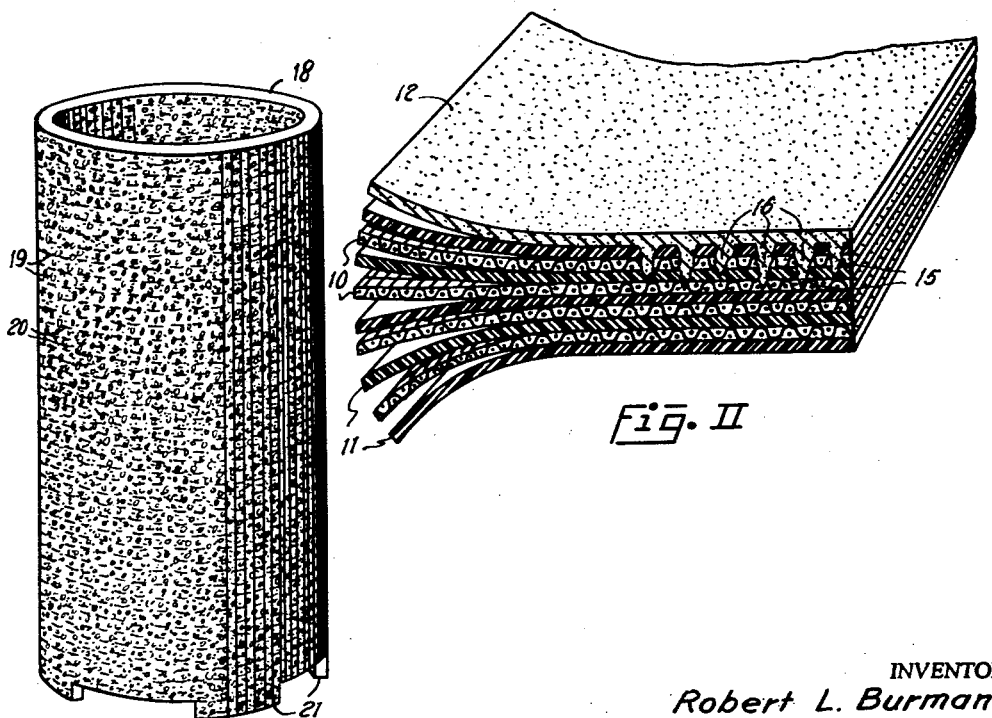
Fig. II
Fig. III
INVENTORS
Robert L. Burman
Monroe Mirsky
BY
ATTORNEYS

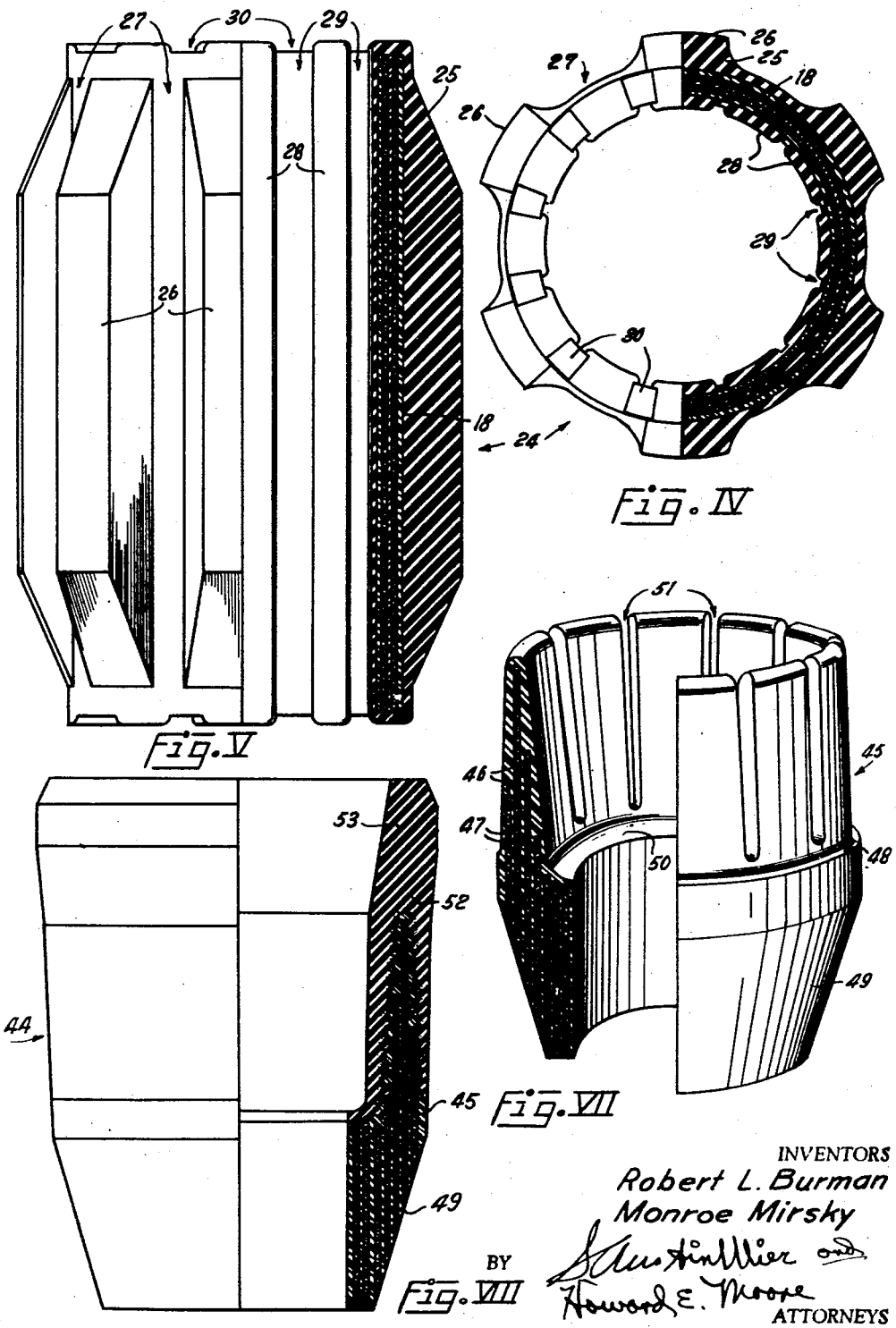

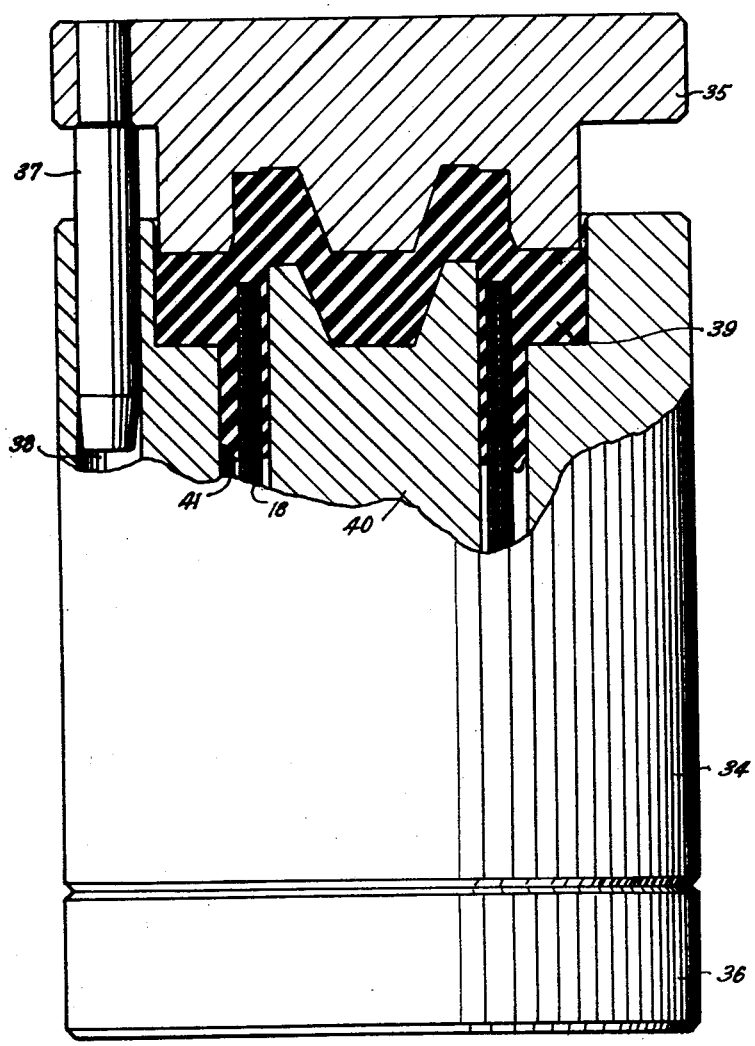
Fig. VI

United States Patent Office 2,943,009
Patented June 28, 1960

2,943,009

PROCESS FOR MAKING REINFORCED RUBBER ARTICLES

Monroe Mirsky and Robert L. Burman, Dallas, Tex., assignors, by mesne assignments, to The Guiberson Corporation, Dallas, Tex., a corporation of Texas Filed June 1, 1956, Ser. No. 588,674

14 Claims. (Cl. 154—110)

This invention is concerned with reinforced rubber articles and a process for making such articles, and is particularly concerned with the reinforcing of rubber articles with a bonded thermo-setting resin and filler reinforcement during the vulcanization and molding of the rubber material.

This invention has particular application in manufacturing reinforced rubber devices used in exploration for, and the production of, oil and gas, such as drill stem stabilizer sleeves, swab cups and well packers. In such devices it is often necessary to reinforce the rubber material with a rigid sleeve or bushing, which heretofore has been made of metal. Such reinforcement is necessary in order to support the rubber material and give the device sufficient strength and stability to withstand the shocks and abuse encountered in use.

Considerable difficulty has been experienced in the manufacture of such metallic reinforced products in that it is difficult to obtain good adhesion of the rubber compound to the metallic reinforcement, with the result that the rubber compound often separates from the sleeve in use, causing it to be torn away from the reinforcement.

Such difficulties have been caused by various factors, such as the difficulty of providing a proper adhesive for bonding the rubber to the metallic material, the difference in heat coefficient between the metal and the rubber, and the fact that the adhesive is wiped away from the surface of the metallic reinforcement by the flow of the rubber material during molding. This last factor is particularly true in the molding of relatively large articles such as the drill stem stabilizer like that shown in Figs. IV and V of the drawings.

Attempts have been made to remedy the foregoing problems, but none have been entirely successful. For instance, holes are often provided in the metallic reinforcement for the rubber material to flow through during molding in an attempt to provide a better bond of the rubber to the reinforcement. This expedient, however, does not prevent the rubber from separating from the reinforcement at the ends.

This invention is intended to provide a better bond between the rubber material and the reinforcement in such devices. In fact by the employment of this process, in making such devices, the reinforcement and the rubber material are bonded together during the molding process in such a way that the reinforcement and rubber material become, in effect, a homogeneous, integral article, so that the rubber material cannot separate from the reinforcement.

It is, therefore, a primary object of this invention to provide a better bond between rubber material and the reinforcement thereof.

A further object of this invention is to provide a reinforcement for rubber articles used in the exploration for, and production of oil and gas, which is completely drillable.

A still further object of this invention is to provide a reinforcement for a rubber article used in the exploration for, and production of, oil and gas which is rigid enough to support the rubber, yet is resilient enough to better absorb shocks to which the article is subjected.

Other and further objects of this invention will become apparent upon reading the detailed specification hereinafter following, and by referring to the drawings annexed hereto.

In the drawings:

Fig. I is a partially sectionalized perspective view of a laminated synthetic resin and glass fiber reinforcement with a rubber compound bonded thereto, said view being exaggerated, to more clearly illustrate the process employed in making reinforced rubber articles in accordance with our invention.

Fig. II is a perspective view of a laminated synthetic resin and glass fiber fabric reinforcement illustrating the adhesive material penetrating the minute cavities in the synthetic resin material and contacting the glass fiber, said view being exaggerated for the purpose of illustration.

Fig. III is a perspective view of the tubular sleeve for reinforcement of a drill stem stabilizer, or like article, made in accordance with our process, showing the indentations or cavities formed in the outer surface of the sleeve prior to molding and bonding the rubber material thereto.

Fig. IV is a partially sectionalized top plan view of a drill stem stabilizer made in accordance with our invention.

Fig. V is a partially sectionalized elevational view of a drill stem stabilizer made in accordance with our invention.

Fig. VI is a partially sectionalized elevational view of a mold for molding a drill stem stabilizer, such as shown in Figures IV and V, showing the tubular reinforcing sleeve in the mold, with a charge of rubber material therein, in position to carry out the molding of the stabilizer.

Fig. VII is a partially sectionalized perspective view of a reinforcing bushing for a swab cup, made in accordance with our invention.

Fig. VIII is a partially sectionalized elevational view of a swab cup, with reinforcing bushing molded therein, made in accordance with our invention.

In the drawings numeral references are employed to designate the various parts, and like numerals indicate like parts throughout the various figures of the drawings.

In Fig. I the process of bonding rubber material to a reinforcing member comprised of laminated synthetic resin and glass fiber fabric is illustrated in exaggerated form in order to make the process clear.

The various components are shown in distinct, separated layers, for purpose of illustration, but it will be understood that these separate components will actually be combined and integrated in the finished article, as hereinafter explained.

In Fig. I the numeral 10 indicates superposed layers of glass fiber fabric with intermediate layers of synthetic resin material 11. In carrying out our process the synthetic resin material, in liquid form, is sprayed, brushed or dipped on the glass fiber fabric as the layers of fabric are successively placed together. The laminated synthetic resin material is then allowed to partially cure by reaction with a hardening agent, mixed therewith, for a period of time, and the laminate is then subjected to heat treatment in order to further partially cure and set the resin. A suitable liquid adhesive compound, such as a polyisocyanate or a polyisothiocyanate, indicated by the numeral 12, is then sprayed or brushed on the surface of the laminated article and the article is placed in a mold with a quantity of unvulcanized rubber material, indicated by the numeral 13, and heat and pressure is applied, sufficient to cause the rubber material to flow over the surface of the laminated plastic and glass fiber and cause the simultaneous vulcanization of the rubber material and the final curing of the synthetic resin material.

In the vulcanization process the rubber material, the synthetic resin material, glass fiber and adhesive become integrated into a homogeneous article, as will be specifically described hereinafter.

A suitable number of layers of glass fiber fabric are employed, sufficient to give the proper physical strength to the reinforcing laminate.

The synthetic resin material employed is that which is generally referred to as thermo-setting resin, of which there are several kinds, commercially available, which would be suitable. The synthetic resin material which has been found most suitable for use in the practice of this invention is that which is generally known as epoxy resin of the semi solid type, being a relatively heavy viscosity liquid. Preferably it should have an epoxide value in the range of 175–300 eq./100 g. Examples of this material are Shell's 828 and 834, and Ciba's 6010 and 6020. The chemical composition of these products are described as low molecular weight, 1,2-epoxy containing polyethers based on the condensation of 2,2-bis-(4-hydroxy-phenyl)-propane (bisphenol-A) and epichlorohydrin. Such synthetic resin material is a polymeric material, and is a molding plastic, which, when combined with an amine or an anhydride will polymerize, and harden and set into a solid plastic material. It will quickly harden and set when subjected to heat and pressure.

In carrying out this process a commercially available hardener or cure agent, metaphenylenediamine, is added to the synthetic resin material sufficient to partially cure and set the synthetic resin material with the glass fiber filler, or other filler, to allow the laminate to withstand the heat of rubber vulcanization (280°–300° F.) without distortion. Examples of such cure agents are Shell's types "CL" and "Z." The "Z" type cure agent is a proprietary liquid mixture of aromatic diamines containing metaphenylenediamine. The "CL" cure agent is metaphenylenediamine (metadiaminobenzene). The cure agent is added in the amounts of 15 to 20 parts per 100 parts of resin. The resin-hardener mixture is applied to the glass fiber fabric as the layers of fabric are placed together in forming the laminate as hereinbefore described.

After the superposed layers of glass fiber have been thus coated and impregnated with the resin-hardener mixture, it is preferable that the laminate be wrapped, under light pressure, in cellophane, for protection during heat curing, and to impart slight pressure to the laminate to cause the resin to flow and bring entrapped air to the surface during the partial curing of the resin by the hardener agent.

After thus wrapping the laminate, it is allowed to cure for approximately 12 hours. During such time reaction occurs between the hardener and the resin and the laminate partially cures and hardens. After this partial curing stage the laminate, still encased in the cellophane wrap, is placed in a heat chamber and subjected to a temperature of approximately 300° F. for about 1 hour, to further partially cure the laminate. At this stage the laminate has had sufficient cure to withstand normal rubber vulcanization temperature (280°–300° F.) and pressures (4,000–8,000 p.s.i.) without distortion. However, it is to be emphasized that the synthetic resin in the laminate has not yet reached its complete and final cure.

During the foregoing pre-cure stages, a strong bond is formed between the glass fiber and the synthetic resin by reason of the natural affinity between the epoxy resin molecule and the hydrogen ion surface on the glass cloth. The resin and glass fiber of the laminate become integrated into a homogeneous article, making a strong, semi-rigid, reinforced material.

The laminate, heretofore described, can be formed in either flat form as shown in Fig. I, or in the form of a cylinder as shown in Fig. III, or in other desired shapes.

To form it into a cylinder 18, as shown in Fig. III, the layers of glass fiber fabric, impregnated with synthetic resin material, are formed about a suitable cylindrical form, where the laminate remains until it is partially set, as described above, at which time it can be removed from the forming support.

After the laminate has been partially cured by reaction with the hardener and by heat treatment, as described above, the wrapping is removed therefrom and it is cut to the proper length and size and machined to proper shape, if shaping is desired.

The surface of the laminate, which is to be bonded to the rubber material, is then treated to form many small indentations or cavities 19 over the entire surface. A preferred way to form such indentations, cavities or pock marks, is to subject such surface to a sand or grit blast. However, they could be formed by other means, such as a tool, operated by hand or by machine, having a roughened surface with which to pound or scrape the surface of the laminate. The formation of the indentations, or pock marks 19, provides for a better bond between the rubber compound and the laminate, as will be explained.

Such indentations or cavities 19 uncover and expose the minute porosity in the synthetic resin material. This porosity results from the entrapping of minute air pockets in the resin material as it cures. Such indentations also expose the outer layers of glass fiber, indicated at 20, to the adhesive and the rubber compound, allowing the adhesive and rubber compound to interact with the resin upon the vulcanization and complete curing of the rubber and the laminate in the mold.

The many small cavities 19 in the surface of the laminate also present recesses for the adhesive to enter where it is held and prevented from being wiped off the surface of the laminate by the normal flow to the rubber compound in filling out the mold cavity.

The exposure of the minute porosity in the resin material allows the adhesive and the rubber material to actually seep down into the interior of the laminate where it remains until it cures and reacts with the resin material and the glass fiber to form a homogeneous bond between the laminate and the rubber compound. This is illustrated in exaggerated form in Fig. II wherein the adhesive, indicated by the numeral 16, has entered the recesses or cavities 15, formed in the surface of the laminate.

The formation of the cavities in the surface of the laminate also exposes the glass fiber of the laminate to the adhesive and forms a better bond between the rubber and the laminate, because there is a definite affinity between the hydrogen ion surface on the glass fiber and the adhesive employed, as previously indicated.

The rubber material employed is preferably synthetic rubber, generally known as chloroprene polymeric rubber, one form of which is that known under the trade name of Neoprene. Another form of synthetic rubber which may be used is butadiene-acrylonitrile polymers, known under the trade name of Hycar. Such synthetic rubber material is highly resistant to oils and chemicals and is particularly satisfactory for use in oil field tools. It is also highly heat resistant and resistant to aging. It is particularly desirable in the practice of this invention because it is polymeric and cured by polymerization when subjected to heat and pressure.

Therefore, there is an affinity between such synthetic rubber material and the synthetic resin employed, because they are both cured by polymerization, and when cured together in the molding process herein described there is a cross-linking of the molecules of the two materials, thereby forming a homogeneous article of the two materials. Therefore, it is virtually impossible for the two materials to be separated after thus being vulcanized and cured together in the manner herein described.

The adhesives employed in this invention are preferably those which are generally known as the polyisocyanates and polyisothiocyanates which can be used to bond either synthetic rubber or natural rubber to the reinforcing laminate.

As stated above it is desirable to employ synthetic rubber materials, but it will be understood that natural rubber can also be employed and secure a superior reinforced rubber article by this process, using the adhesives hereinbefore indicated. However, it has been found that a superior bond can be secured between natural rubber and the reinforcing laminate by employing other adhesives known commercially as Thixon P-2 and CB-2. Thixon P-2 is a composition comprising a non-volatile film forming portion suspended and dissolved in a volatile organic solvent. It contains volatile solvents of the class of the so-called "lacquer solvent" family, and includes low boiling ketone, acetate and hydrocarbon solvents. The solids include materials from the class of elastomers and derivatives of elastomers, chemicals which are reactive with elastomers, resins resulting from the condensation of various organic chemicals, pigments and activators. This description also applies to Thixon CB-2 with the exception that the solvent system in Thixon CB-2 is confined to hydrocarbon solvents. These materials are complex formulations especially prepared for bonding polymeric material aand are especially useful for bonding rubber material during vulcanization.

The adhesive material 12 is a specially prepared, commercially available material, which combines with the rubber material and the synthetic resin of the laminate to form a better bond. The adhesive aids in forming a strong chemical cross-linking between the rubber compound and the epoxy resin of the laminate during the vulcanization process. The adhesives also form a very strong physical bond to the glass fiber of the laminate by virtue of its affinity for hydrogen ions on the surface of the glass fiber, and when the adhesive is cross-linked to the rubber compound, and the rubber compound is cross-linked to the synthetic resin of the laminate, the finished article is, in effect, one homogeneous unit.

After the laminate has been sand blasted, or otherwise treated, to form the many cavities 19 in the surface thereof, it is recommended that it be subjected to a vapor degrease treatment of trichloroethylene to remove any foreign material from the surface thereof and any moisture that may have collected on the surface. The laminate is then brushed, sprayed or dipped with the liquid adhesive so that the surface is coated therewith.

The adhesive is then allowed to seep into the small cavities 19 in the laminate and is allowed to partially dry for a period of about one hour. The laminate is then inserted into the mold. A sufficient quantity of unvulcanized rubber material is then placed in the mold. The mold is closed and the rubber material and laminate is subjected to a temperature of 280°–300° F. and a pressure of 4,000–8,000 p.s.i. for a period of 30 minutes to 4 hours, depending upon the size and thickness of the rubber material. In any event the heat and pressure is applied in sufficient magnitude and for sufficient time to cause the rubber to flow into the shape of the mold and to surround the laminate and to become vulcanized and cured and bonded thereto as the plastic laminate is brought to a complete cure.

Since the synthetic resin material of the reinforcing laminate has only been partially cured or polymerized before placing in the mold, the heat and pressure finishes the complete polymerization and curing of the synthetic resin material of the laminate.

As the synthetic rubber material and the synthetic resin material of the laminate are thus brought to a complete cure while in contact, and the polymerization process takes place simultaneously in the two materials, the molecules of the two materials are cross-linked to form a homogeneous reinforced rubber article. After the article has thus been vulcanized and cured, it is ready to be completed by cleaning and cutting excess rubber material therefrom.

Although it is preferable to make the combination glass fiber and synthetic resin reinforcement by laminating glass fiber fabric and resin, in the manner hereinbefore described, it will be understood that the reinforcement may be made by molding it of a mixture of glass fiber and resin. In such case, the glass fiber may be in the form of strands, or it may be chopped, and mixed with the unsolidified synthetic resin. The mixture is placed in a mold, in the usual manner, and heat and pressure is applied to cause it to flow and cure into the shape of the mold cavity. The molded reinforcement is only partially cured to give it sufficient rigidity and hardness to withstand the heat of the molding and vulcanization of the rubber material without distortion. After the molded synthetic resin and glass fiber mixture is thus partially cured, the surface thereof is preferably subjected to sand blasting or other operation to form cavities therein, as hereinbefore described. Adhesive is then applied to the surface, and it is placed in the mold with the rubber compound, and the reinforcement piece and the rubber compound are then molded together in the manner hereinbefore described.

In Figs. IV and V is shown a drill stem stabilizer made in accordance with the process described herein. The drill stem stabilizer, indicated generally by the numeral 24, is a rubber reinforced sleeve or bushing which is placed about the drill stem in drilling an oil, gas, or water well for the purpose of centering the drill stem in the well bore to provide for the drilling of a straight hole and to protect the drill stem from damage by contact with the walls of the well bore while the drill stem is rotating. The tubular core 18, made of laminated or molded synthetic resin and glass fiber, is coated on the inner and outer sides with rubber material 25, the rubber material being molded and bonded with the tubular core to form a homogeneous article, as hereinbefore described.

The rubber material 25 is molded to form spaced longitudinal ribs 26 on the outer side, between which are longitudinal flow channels 27. The ribs 26 are arranged to contact the wall of the well bore, and the flow channels 27 permit circulation of well fluid between the well bore and the stabilizer during drilling.

The rubber material 25 is also molded to form a plurality of spaced longitudinal inner ribs 28 on the inner side of the stabilizer, forming therebetween longitudinal flow channels 29. Slots 30 are formed in the rubber material on the ends of the stabilizer. The slots 30 communicate with the inner channels 29 to permit circulation of well fluid between the drill stem and the stabilizer, and outwardly of the drill stem, thus providing continuous lubrication between the drill stem and the stabilizer. The drill stem is loosely disposed in the stabilizer, thus permitting the drill stem to rotate within the stabilizer as the outer ribs 26 contact the walls of the well bore.

The laminated synthetic resin and glass fiber core 18 is rigid enough to support the rubber material 25, yet is resilient enough to absorb shocks to which the stabilizer is subjected in use.

The tubular reinforcing cores of such stabilizers have heretofore been made of metal, which was rigid and nonflexible, and could not be drilled. Often such stabilizers become wedged or stuck in the well bore, or the drill stem becomes lodged in the hole or broken off, necessitating the running of an overshot tool over the stabilizer, to retrieve the drill stem, which requires that the stabilizer be drilled up in order to get below the stabilizer with the overshoot tool. Such operation is often rendered impossible in using a stabilizer with a metallic core, because the metallic core is not drillable. The glass fiber and synthetic resin core is readily drillable, thus eliminating this problem.

The tubular core 18 may have teeth 21, formed on the lower end which are engageable with clutch teeth on a base ring (not shown) on the drill stem to lock the stabilizer against rotation to permit drilling it up.

Furthermore the rubber material 25 is so integrated with the core 18 that the rubber material cannot separate from the core, as was often the case in using a metallic reinforcing core.

In Fig. VI is shown a suitable mold for making the stabilizer 24, in accordance with the process hereinbefore described. Such mold consists of a hollow body 34 with a detachable top 35 and a detachable base 36. The top 35 has a guide pin 37 attached thereto, which slidably enters the guide bore 38 in the body 34, in order to maintain the top in correct alignment with reference to the body.

The synthetic resin and glass fiber core 18 is placed in the mold cavity 41 about the ram 40, and a suitable amount of unvulcanized rubber material 39 is placed in the mold and the top 35 is placed thereover. The mold is mounted in a conventional mold press which is arranged to exert pressure between the mold body 34 and the top 35, at the magnitude already mentioned, and heat is simultaneously applied to the mold in the required amount, as hereinbefore described. The heat and pressure causes the rubber material to flow into the mold cavity about the reinforcement sleeve 18, and such heat and pressure is applied and maintained for sufficient length of time, as previously indicated, to completely vulcanize and cure the rubber material 39 and to completely cure the core 18, causing them to become integrated into a homogeneous body.

As described, the tubular core 18 is only partially cured before placing in the mold and has been treated to form cavities 19 on the surface thereof. The ram 40 and the cavity 41 are suitably shaped to form the ribs 26 and 28 on the outer and inner sides of the stabilizer.

Various other reinforced rubber articles may be made by practicing the process hereinbefore described, such as a swab cup 44, shown in Figure VIII. The tubular core 45 for the swab cup 44 is preferably made of laminated layers 46 of glass fiber fabric and epoxy resin 47. The core 45 is formed and partially cured as a cylindrical member, similar to that indicated in Fig. III, by the process heretofore described.

It will be understood, however, that the glass fiber and synthetic resin core for the stabilizer 24 or swab cup 44 could be molded and partially cured, employing a mixture of glass fiber and synthetic resin.

After the cylindrical member is thus formed it is machined to form an annular shoulder 48 on the outer side, and a tapered surface 49 on the lower end. A shoulder 50 is machined on the inner side. The inner and outer surfaces of the reinforcing sleeve 45, to which the rubber material is bonded, are then preferably subjected to sand blasting to form small cavities therein, as previously described.

The upper end of the sleeve 45 may be provided with longitudinal slots 51 in order to give the swab cup 44 additional resiliency. However, it will be understood that such slots are optional and that the swab cup can be made without same.

The sleeve 45 is then placed in a mold (not shown) with a suitable amount of rubber material 52 and heat and pressure is applied in sufficient magnitude to cause the rubber material to flow into the shape of the mold and about the sleeve 45 and to completely vulcanize and cure the rubber material 52 and to completely cure the resin material of the sleeve 45 to form a homogeneous article, as shown in Fig. VIII. The tubular core 45 and the rubber material 52 become a homogeneous article as previously described. When finished the cup 44 is provided with a free lip 53 of resilient material.

The rubber material will not separate from the sleeve, the sleeve is more resilient than metallic sleeves heretofore employed in swab cups, and it is readily drillable in the event that the swab cup becomes lodged in the well pipe.

It will be understood that the process of molding rubber material to the composite reinforcement of synthetic resin and glass fiber, as described, has utility and advantage, as indicated, in making any reinforced rubber article, whether it be flat, cylindrical, or any other desired shape. The rubber material becomes integrated with the reinforcement and the finished product has the advantages already indicated.

Other reinforcement filler material may be bonded with the resin material to form the rubber reinforcement, such as cotton fiber or fabric, synthetic fiber or fabric (such as nylon or rayon), aluminum, iron or mica, but it has been found that glass fiber gives maximum strength and physical properties. The reaction and homogeneous integration between the rubber material and resin would result regardless of the type of filler used for the resin material. However, there is a chemical reaction and integration between the glass fiber and the resin and adhesive not present when other filler materials are used, resulting in a stronger reinforcement for the rubber material.

We claim:

1. The process of making a reinforced rubber article comprising: The provision of a reinforcement member of bonded thermo-setting epoxy resin and glass fiber filler; the formation of a multiplicity of cavities in the surface of the reinforcement member sufficiently deep to expose the glass fiber filler and the minute porosity of the epoxy resin; the application of an adhesive to the surface of the reinforcement member; the placing of the reinforcement member in a mold; the placing of a quantity of unvulcanized rubber material in the mold; and the application of heat and pressure to the rubber material and the reinforcement member sufficient to cause the rubber material to be distributed in the mold over the surface of the reinforcement member and to vulcanize the rubber material and cure the reinforcement member.

2. The process of making a reinforced rubber article comprising: The provision of a tubular reinforcement member of bonded thermo-setting epoxy resin and glass fiber filler; the formation of a multiplicity of cavities in the surface of the reinforcement member sufficiently deep to expose the glass fiber filler and the minute porosity of the epoxy resin; the application of an adhesive to the surface of the reinforcement member; the placing of the reinforcement member in a mold; the placing of a quantity of unvulcanized rubber material in the mold; and the application of heat and pressure to the rubber material and the reinforcement member sufficient to cause the rubber material to be distributed in the mold over the surface of the reinforcement member and to vulcanize the rubber material and cure the reinforcement member.

3. The process of making a reinforced rubber article comprising: The preparation of a mixture of thermo-setting epoxy resin, glass fiber and hardener; the application of heat and pressure to the mixture to partially set and solidify the resin into a reinforcement member; the formation of a multiplicity of cavities in the surface of the reinforcement member sufficiently deep to expose the glass fiber and the minute porosity of the resin; the application of an adhesive to the surface of the reinforcement member; the placing of the reinforcement member in a mold; the placing of a quantity of unvulcanized rubber material in the mold; and the application of heat and pressure to the rubber material and the reinforcement member sufficient to cause the rubber material to be distributed in the mold over the surface of the reinforcement member and to vulcanize the rubber material and completely cure the reinforcement member.

4. The process of making a reinforced rubber article comprising: The placing together of a plurality of layers of glass fiber fabric interspersed with a mixture of hardener and uncured thermo-setting epoxy resin; allowing the thermo-setting resin to partially cure by reaction with the hardener; the application of heat and pressure to the laminated glass fiber and resin sufficient to further partially cure the resin; the formation of a multiplicity of cavities in the surface of the laminated member sufficiently deep to expose the glass fiber and the minute porosity of the resin material; the application of adhesive to the surface of the reinforcement member; placing the laminated member in a mold; the placing of a quantity of unvulcanized rubber material in the mold; and the application of heat and pressure to the rubber material and the laminated member sufficient to cause the rubber material to be distributed in the mold over the surface of the laminated member and to vulcanize the rubber material and completely cure the reinforcement member.

5. Claim 4 wherein the laminated member is tubular in shape.

6. Claim 4 wherein an adhesive is applied to the surface of the laminated member prior to placing it in the mold.

7. A process of making a reinforced rubber article comprising: the provision of a reinforcement member of bonded thermo-setting epoxy resin and glass fiber filler; the formation of a multiplicity of cavities in the surface of the reinforcement member sufficiently deep to expose the glass fiber filler and the minute porosity of the epoxy resin; the application to the surface of the reinforcement member of an adhesive comprising a member of the group consisting of polyisocyanates and polyisothiocyanates; the placing of the reinforcement member in a mold; the placing of a quantity of heat vulcanizable rubber material in the mold; and the application of heat and pressure to the rubber material and the reinforcement member sufficient to cause the rubber material to be distributed in the mold over the surface of the reinforcement member and to vulcanize the rubber material and cure the reinforcement member.

8. The process called for in claim 7 wherein the rubber material is natural rubber.

9. The process called for in claim 7 wherein the rubber material is chloroprene polymeric material.

10. The process called for in claim 7 wherein the rubber material is butadiene-acrylonitrile polymers.

11. The process of making a reinforced rubber article comprising: The placing together of a plurality of layers of glass fiber material interspersed with a mixture of hardener and uncured thermo-setting epoxy resin; allowing the resin to partially cure by reaction with the hardener; the application of heat and pressure to the laminated glass fiber and resin sufficient to further partially cure the resin; the formation of the multiplicity of cavities in the surface of the laminated member sufficiently deep to expose the glass fiber and the minute porosity of the resin material; the application to the surface of the laminated member of an adhesive comprising a member of the group consisting of polyisocyanates and polyisothiocyanates; the placing of a quantity of heat vulcanizable rubber material in the mold; and the application of heat and pressure to the rubber material and the laminated member sufficient to cause the rubber material to be distributed in the mold over the surface of the laminated member and to vulcanize the rubber material and cure the reinforcement member.

12. The process as called for in claim 11 wherein the rubber material is natural rubber.

13. The process as called for in claim 11 wherein the rubber material is chloroprene polymeric material.

14. The process as called for in claim 11 wherein the rubber material is butadiene-acrylonitrile polymer material.

References Cited in the file of this patent
UNITED STATES PATENTS

| Number | Name | Date |
|---|---|---|
| 846,387 | Beebe | Mar. 5, 1907 |
| 1,484,937 | Egerton | Feb. 26, 1924 |
| 2,041,357 | Kraft | May 19, 1936 |
| 2,429,397 | Compton et al. | Oct. 21, 1947 |
| 2,477,407 | Grant et al. | July 26, 1949 |
| 2,571,345 | D'Ianni | Oct. 16, 1951 |
| 2,631,463 | Waugh | Mar. 17, 1953 |
| 2,642,920 | Simon et al. | June 23, 1953 |
| 2,706,166 | Gurney | Apr. 12, 1955 |
| 2,715,552 | Lane | Aug. 16, 1955 |
| 2,743,207 | Rusch | Apr. 24, 1956 |
| 2,793,971 | Collins et al. | May 28, 1957 |
| 2,837,458 | Coleman | June 3, 1958 |